E. C. THORSCHMIDT.
LIQUID MEASURING AND DISPENSING DEVICE.
APPLICATION FILED FEB. 8, 1916.
1,191,484.
Patented July 18, 1916.
2 SHEETS—SHEET 1.
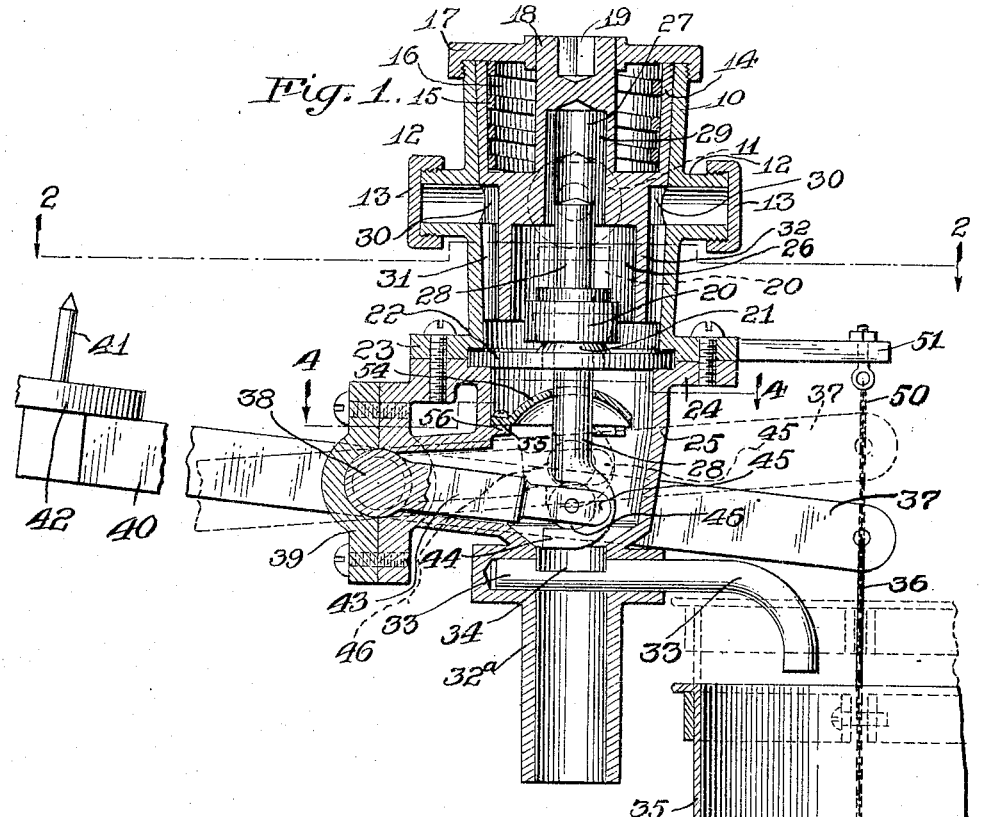
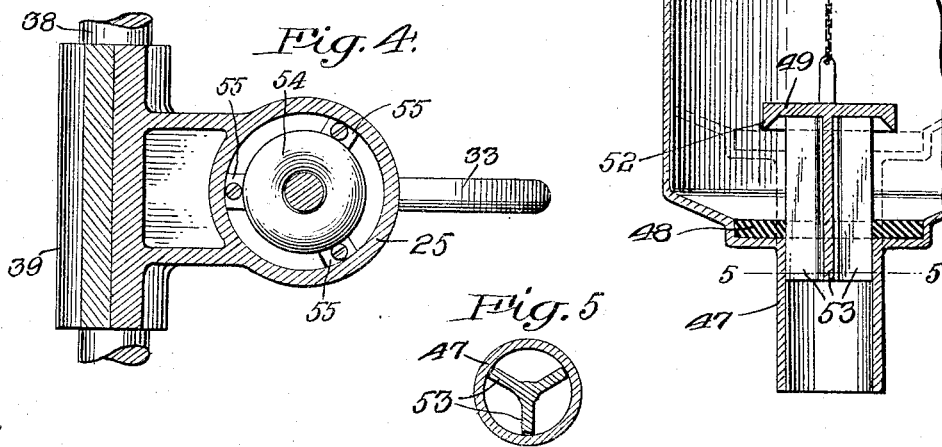
Inventor
Ernest C. Thorschmidt
By his Attorneys
Ashley & Cohen

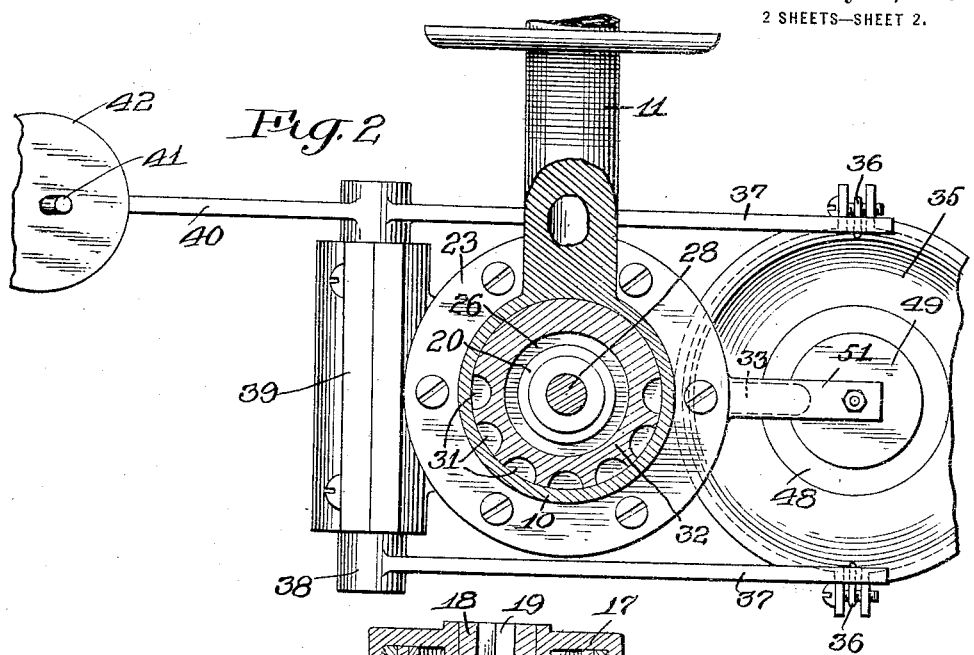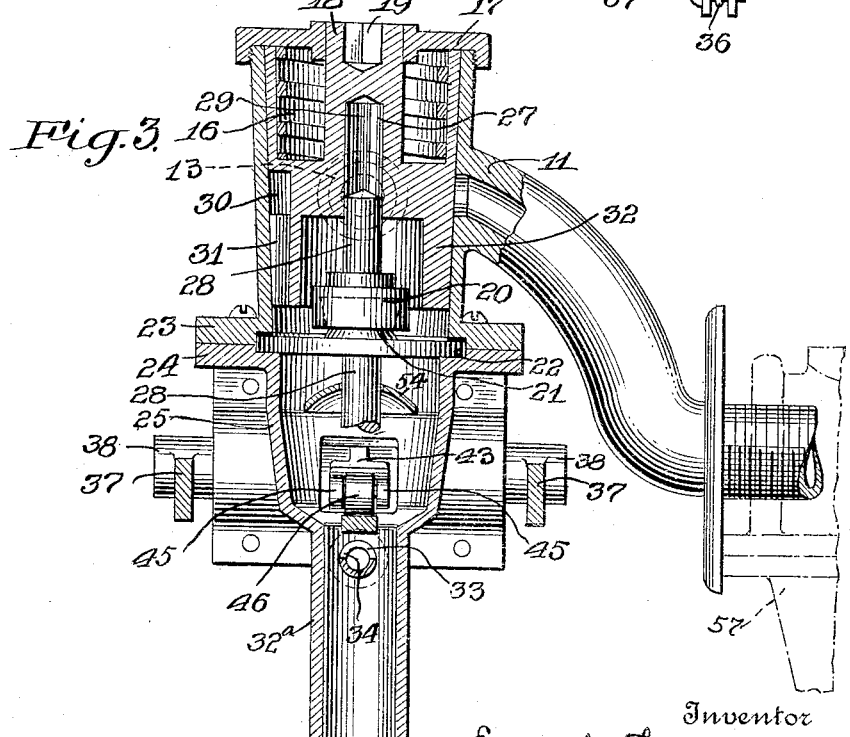

UNITED STATES PATENT OFFICE.

ERNEST C. THORSCHMIDT, OF NEW YORK, N. Y.

LIQUID MEASURING AND DISPENSING DEVICE.

1,191,484.    Specification of Letters Patent.    Patented July 18, 1916.

Application filed February 8, 1916. Serial No. 77,088.

*To all whom it may concern:*

Be it known that I, ERNEST C. THORSCHMIDT, a citizen of the United States, and a resident of New York city, borough of Brooklyn, in the county of Kings and State of New York, have invented certain new and useful Improvements in Liquid Measuring and Dispensing Devices, of which the following is a specification.

This invention relates to liquid measuring and dispensing devices, particularly of the type described in my prior Patent No. 1,115,036, October 27th, 1914.

One object of the present invention is to provide a device of this character of as simple and compact construction as is consistent with accuracy of measurement.

Another object is to provide a construction in which the liquid in the measuring cup flows directly down into the container when the requisite amount has been drawn.

A further object is to shield the valve head from the flow of liquid so as to prevent interference with the accuracy of measurement.

The various further objects and advantages will more fully appear hereinafter.

In the drawings illustrating the preferred embodiment of the invention, Figure 1 is a sectional elevation of the improved device. Fig. 2 is a sectional plan view, the section being taken along line 2—2 of Fig. 1. Fig. 3 is a sectional elevation, the section being taken at right angles to the section in Fig. 1. Figs. 4 and 5 are sections taken respectively on line 4—4 and line 5—5 of Fig. 1.

In one of its broad aspects, my improvement consists in combining compactly with a manually operated valve for turning on and off the supply of liquid, an automatic valve, the operation of which is controlled in accordance with the amount of liquid dispensed.

The valve casing 10 may have leading therefrom one or more pipes 11 through which the liquid is drawn. Only one pipe is illustrated, but it will be understood that additional pipes may be connected to the valve casing as by unions with the nipples 12 integral with the casing. I have illustrated these nipples as closed by caps 13 in case only one pipe connection is used.

Within the casing 10 is disposed the valve stem 14 which is preferably tapered to fit a corresponding taper of the bore of the casing 10. A spring 15 disposed in an annular recess 16 formed at the top of the stem bears at its upper end against a cap 17 which closes the upper end of the casing, and thus the stem is held in a snug fit within the tapered bore of the casing. A central extension 18 of the stem extends through the cap 17 to the exterior of the casing and may be manipulated by a suitable key in the key socket 19 to turn the valve.

In addition to the manually operated valve, an automatic valve 20 is provided which seats automatically to shut off the flow of liquid when the required amount has been drawn. This valve 20 seats against a valve seat 21 formed on a washer 22 which is clamped between a flange 23 formed at the bottom of the casing 10 and the flange 24 formed at the top of a casing 25 to be hereinafter more fully described. Suffice it to say for the present that within this casing are means extending from the exterior of the device whereby the automatic valve 20 is closed as soon as the required amount of liquid has been drawn.

The valve stem 14 is formed with a recess 26 at the lower end thereof into which the valve 20 may pass when it is raised to start the flow of the liquid. An extension 27 of the recess entering into the central projection 18 forms a guide for the valve stem 28 of the valve 20. It will be noted that the recess 26 is somewhat larger than the diameter of the valve 20 and the extension 27 of the recess is formed with channels 29 which permit the ready flow of the liquid past the valve and rod, thus giving assurance that the valve will not stick.

To provide for the admission of the liquid by the valve 14, the periphery thereof is formed at a point in alinement with the admission opening of the pipe 11 and the nipples 12 with a groove 30 which extends part way around the same, as will clearly appear from Figs. 1 and 3 of the drawings. Communicating with this groove are a number of vertical channels 31, cored on the surface of the portion of the valve depending below the groove 30. When the valve 14 is turned into a position in which the groove 30 is in registration with the pipe 11, the liquid will flow from the pipe through the groove 30 and channels 31 into the bottom of the casing 10, and, if the valve 20 has been raised past the valve seat 21, through the lower casing 25 and into the container or receptacle, as will be more fully explained hereinafter.

It will be noted that the portion of the valve 14 surrounding the chamber 26 forms an apron 32 which envelops the valve 20 in its upward open position illustrated in dotted lines in Fig. 1, and so that, when the liquid is flowing, there is no tendency to exert a force to close the same, thus avoiding any inaccuracy of measurement due to the flow of the liquid. Furthermore, the valve 14 itself telescopes with the automatic valve 20, so that a maximum economy of space is attained.

The liquid, passing through the measuring valve, is measured by shunting a part of it through a by-pass into a measuring receptacle and thus emptied into the container into which the liquid is drawn as follows: The lower casing 25 is formed with a nozzle or discharge opening 32ª, and extending preferably transversely into the nozzle is a small pipe or nozzle 33. The latter has the upper side thereof cut away at 34 at the interior of the nozzle 32, thus forming a by-pass through which a portion of the liquid is shunted off, depending upon the relative areas of the nozzle 32ª and the opening in the pipe 33. Disposed beneath the mouth of the small nozzle or by-pass 33 is a measuring receptacle 35 suspended by rods or chains 36 from two arms 37 of a lever 38 fulcrumed in a bearing 39. The opposite arm 40 of the lever has a pin 41 over which weights 42 may be placed to balance the liquid in the measuring receptacle 35. The lever 38 has an arm 43 extending into the interior of the casing 25 and engages a hooked portion 44 formed upon the lower portion of the valve rod 28. Preferably the arm 43 is formed with a fork 45 having a roller 46 which engages into the hook 44, and thus reducing the friction of contact.

When a desired amount of liquid is to be measured, the corresponding weight is put on the pin 41 and the arm 40 of the lever 38 is depressed, thus raising the valve 20, whereupon the liquid will start to flow through the nozzle 32 into the container and also through the nozzle 33 into the measuring receptacle 35. When a certain amount of liquid has flown into the measuring receptacle 35, corresponding to the weight on the pin 41, the lever will be swung on its fulcrum on the bearing 39 to seat the valve 20, and thus shut off further flow. As the measuring receptacle 35 drops from the position in dotted lines to the position in full lines in Fig. 1, the valve in the bottom of the receptacle is opened to discharge the liquid therefrom through the bottom of the measuring receptacle into the same container which is used to receive the main body of the liquid. This is accomplished as follows:

The bottom of the measuring receptacle is formed with a tubular extension 47 around which is formed at the interior a valve seat 48 of rubber or similar material inserted in a recess formed around the opening. A valve head 49 is suspended by a chain 50 from a suitable stationary point as a lug 51 extending from the casing. The valve head is formed preferably with a sharp edge 52 which seats upon the material 48 and forms a close fit therewith. Depending ribs or wings 53 extending loosely into the tubular portion 47 serve to center the valve and maintain it in proper seating position. It will be noted that when the measuring receptacle 35 is in its upper position, corresponding to the open position of the valve 20, to dispense the liquid, the valve 49 is seated. However, as soon as the desired amount of liquid is dispensed and the measuring cup 35 drops into the full line position, the valve 49 is opened and the liquid is discharged from the measuring cup into the container, holding the rest of the liquid.

It will be noted, as above described, that when the valve 14 is turned on, the liquid running through the groove 30 and the channels 31 is prevented by the apron 32 from exerting a pressure upon the valve 20. Similarly, I provide in the lower casing 25 a guide washer 54 which guides and steadies the lower portion of the rod 31 and also serves to protect the hook portion 44 from the flow of the liquid.

Referring to Figs. 1, 3 and 4, it will be noted that the washer is of spherical shape and is attached by a number of ears 55 to lugs 56 formed in the interior of the casing. The liquid passes in the segmental openings formed between the periphery of the washer and the interior of the casing, and when the valve 20 is raised, the liquid flowing along the walls of the casing will not impinge upon the hooked portion 44.

If desired, a reducing valve 57, shown diagrammatically in dotted lines in Fig. 3, may be inserted in the pipe 11 leading to the valve casing. This will insure a uniform low pressure in the valve in case the device is used for measuring beer or carbonated beverages. Instead of being in the pipe 11, the reducing valve may be inserted in the air pressure line when the device is used in a system utilizing air pressure such as in a beer dispensing system.

It will be seen from the above description that I have provided a measuring device of this character which is very compact and accurate in measurement. The liquid empties directly from the bottom of the measuring cup as soon as the amount is measured and thus insures that none will spill over and makes it easy to reset the device.

It will be understood, of course, that various modifications will suggest themselves to those skilled in the art. I, therefore, do not wish to be limited to the details of the preferred form illustrated, but

What I claim as new and desire to secure by Letters Patent is:

1. A liquid measuring and dispensing device comprising a valve, a valve casing having a discharge opening, a by-pass extending from the opening, a measuring receptacle for receiving the liquid from the by-pass, means in connection with the valve and measuring receptacle whereby the valve is closed when the desired amount of liquid has been drawn, and means operating in conjunction with the first mentioned means for discharging the liquid from the receptacle without tipping the latter.

2. A liquid measuring and dispensing device comprising a valve, a valve casing having a discharge opening, a by-pass extending from the opening, a measuring receptacle for receiving the liquid from the by-pass, means in connection with the valve and measuring receptacle whereby the valve is closed when the desired amount of liquid has been drawn, the receptacle having an opening in the bottom thereof, means for closing the opening, and means in connection with the valve casing means whereby the relative movement is caused between the closure and receptacle to empty the contents of the receptacle.

3. A liquid measuring and dispensing device comprising a valve, a valve casing having a discharge opening, a by-pass extending from the opening, means extending to the exterior of the casing for opening the valve, a measuring receptacle suspended by said means, and means whereby the closure of the valve empties the contents of the receptacle.

4. A liquid measuring and dispensing device comprising a valve, a valve casing having a discharge opening, a by-pass extending from the opening, a lever for opening and closing the valve extending to the exterior of the casing, a measuring cup suspended by said lever, and means whereby the overbalancing of said lever by the measuring cup empties the liquid therefrom.

5. A liquid measuring and dispensing device comprising a valve, a valve casing having a discharge opening, a by-pass extending from the opening, a lever for opening and closing the valve extending from the casing, provisions for applying a weight to the lever at one end thereof, and a measuring receptacle suspended from the other end of the lever, and means for emptying the contents of the receptacle when the weight is overbalanced.

6. A liquid measuring and dispensing device comprising a valve, a valve casing having a discharge opening, a by-pass extending from the opening, a lever for opening and closing the valve extending from the casing, provisions for applying a weight to the lever at one end thereof, a measuring receptacle having an opening at the bottom thereof suspended from the other end of the lever, and means for uncovering said opening to empty the contents of the receptacle when the weight is overbalanced.

7. A liquid measuring and dispensing device comprising a valve, a valve casing having a discharge opening, a by-pass extending from the opening, a lever for opening and closing the valve extending from the casing, provisions for applying a weight to the lever at one end thereof, a measuring receptacle having an opening at the bottom thereof suspended from the other end of the lever, a closure for said opening suspended from a stationary support, the receptacle dropping away from said closure to permit the liquid therein to escape through the bottom thereof when the lever is overbalanced to close the valve.

8. In a liquid measuring and dispensing device, a gage lever, a receptacle suspended therefrom having an opening in the bottom thereof, a closure for said opening suspended from a stationary support, the receptacle dropping away from the closure when the lever is overbalanced to permit the liquid in the receptacle to escape from the bottom thereof.

9. In a liquid measuring and dispensing device, a gage lever, a receptacle suspended therefrom having an opening in the bottom thereof, a closure for the opening comprising a head and wings depending therefrom through the opening to center the head, the receptacle dropping away from the closure when the lever is overbalanced to permit the liquid in the receptacle to escape from the bottom thereof.

10. In a liquid measuring and dispensing device, a gage lever, a receptacle suspended therefrom having an opening in the bottom thereof, a packing ring surrounding the opening, a closure for the opening having a sharp annular edge to seat thereon, and wings depending therefrom through the opening to center the head, the receptacle dropping away from the closure when the lever is overbalanced to permit the liquid in the receptacle to escape from the bottom thereof.

11. A liquid measuring and dispensing device comprising a casing, a valve stem therein formed with a passage therein to admit the liquid to the interior of the casing, an automatic valve telescoped within the first mentioned valve to control the flow of liquid from the casing, and means controlled by the flow of the liquid to operate the automatic valve.

12. In a liquid measuring and dispensing device, a casing having a tapered bore, a tapered valve seated within the bore, said valve having a recess in the upper end thereof, a spring in the recess, a recess in the lower end of the valve, an automatic valve telescoped within the lower recess, and means controlled by the amount of liquid dispensed to operate the automatic valve.

13. In a liquid measuring and dispensing device, a casing, a valve therein having a passage on the periphery thereof and a depending apron, an automatic valve, means for raising said automatic valve into a recess within the first mentioned valve embraced by said apron, and means controlled by the amount of liquid dispensed for operating the automatic valve.

14. In a liquid measuring and dispensing device, a casing, a valve therein having a passage on the periphery thereof and a depending apron, there being channels formed in the apron to conduct the liquid from said passage to the interior of the casing, an automatic valve, means for raising said automatic valve into a recess within the first mentioned valve embraced by said apron, and means controlled by the amount of liquid dispensed for operating the automatic valve.

15. In a liquid measuring and dispensing device, a casing, a rotary valve therein having a peripheral passage for the admission of the liquid, a recess formed in the bottom of the valve, said recess having an upward extension, an automatic valve having a head movable into said recess, and a rod projecting into the extension and guided therein, and means controlled by the amount of liquid dispensed for operating the automatic valve.

16. In a liquid measuring and dispensing device, a casing, a rotary valve therein having a peripheral passage for the admission of the liquid, a recess formed in the bottom of the valve, said recess having an upward extension formed with channels, an automatic valve having a head movable into said recess and a rod projecting into the extension and guided therein, said channels facilitating the circulation of the liquid in the extension of the recess, and means controlled by the amount of liquid dispensed for operating the automatic valve.

17. In a liquid measuring and dispensing device, a casing, a rotatable valve therein and a reciprocating automatic valve telescoped within the rotatable valve, means within the rotatable valve for guiding one end of the valve rod of the reciprocating valve, a valve seat, means below the valve seat for guiding the other end of the rod, and means controlled by the amount of liquid dispensed for operating the automatic valve.

18. In a liquid measuring and dispensing device, a valve casing formed in two portions, a valve seat comprising a washer clamped between said portions of the casing, a rotatable valve within the upper portion of the casing, a reciprocating automatic valve seating on said valve seat, and means controlled by the amount of liquid dispensed for operating the automatic valve.

19. In a liquid measuring and dispensing device, a valve casing formed in two portions, a valve seat comprising a washer clamped between said portions of the casing, a rotatable valve within the upper portion of the casing, a reciprocating automatic valve seating on said valve seat, and guided in a recess in the first mentioned valve, and means controlled by the amount of liquid dispensed for operating the automatic valve.

20. In a liquid measuring and dispensing device, a valve casing formed in two portions, a valve seat comprising a washer clamped between said portions of the casing, a rotatable valve within the upper portion of the casing, a reciprocating automatic valve seating on said valve seat and guided in a recess in the first mentioned valve above the valve seat, and a washer below the valve seat for guiding the lower end of the reciprocating valve, and means controlled by the amount of liquid dispensed for operating the automatic valve.

21. In a liquid measuring and dispensing device, a valve casing formed in two portions, a valve seat comprising a washer clamped between said portions of the casing, a rotatable valve within the upper portion of the casing, a reciprocating automatic valve seating on said valve seat and guided in a recess in the first mentioned valve above the valve seat and a washer below the valve seat for guiding the lower end of the reciprocating valve, said washer having a central guiding aperture and peripheral ears attached to the interior of the casing, and means controlled by the amount of liquid dispensed for operating the automatic valve.

22. In a liquid measuring and dispensing device, a valve casing having a number of admission ports, a rotatable valve within the casing having a peripheral groove which can be turned into communication with said ports, said valve being formed with an interior recess, a reciprocating valve within said recess, and means controlled by the amount of liquid dispensed for operating the reciprocating valve.

23. In a liquid measuring and dispensing device, a valve casing, a rotary valve therein, a reciprocating automatic valve having a head movable into a recess in the rotary valve, the portion of the rotary valve about said recess forming an apron through which the liquid is conducted to the interior of the casing below the reciprocating valve head, a valve seat for the reciprocating valve, a guiding washer below the valve seat having an interior bore for the valve rod and peripheral ears to secure the washer to the casing, there being passages formed between said ears for the liquid to pass, a hook formed on the valve rod, means engaging the hook controlled by the amount of liquid dispensed to close the valve, said hook when raised being covered by the washer to shield the same from the flow of the liquid.

Signed at New York city, in the county of New York, and State of New York, this 25th day of January, A. D. 1916.

ERNEST C. THORSCHMIDT.

Witnesses:
MINNIE S. MILLER,
NATHAN COHEN.

Copies of this patent may be obtained for five cents each, by addressing the "Commissioner of Patents, Washington, D. C."